US008166396B2

(12) United States Patent
Farn

(10) Patent No.: US 8,166,396 B2

(45) Date of Patent: Apr. 24, 2012

(54) USER INTERFACE RENDERING

(75) Inventor: Brian G. Farn, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 915 days.

(21) Appl. No.: 12/196,430

(22) Filed: Aug. 22, 2008

(65) Prior Publication Data

US 2010/0050130 A1 Feb. 25, 2010

(51) Int. Cl.
*G06F 13/00* (2006.01)
*G06F 15/00* (2006.01)

(52) U.S. Cl. ........................................ 715/713; 715/853

(58) Field of Classification Search .......... 715/851–853, 715/739–741, 761–765, 780, 804, 810
See application file for complete search history.

(56) References Cited

U.S. PATENT DOCUMENTS

| | | | | |
|---|---|---|---|---|
| 2001/0024211 | A1 | 9/2001 | Kudukoli et al. | |
| 2002/0078255 | A1 * | 6/2002 | Narayan | 709/316 |
| 2006/0206856 | A1 | 9/2006 | Breeden et al. | |
| 2006/0225032 | A1 | 10/2006 | Klerk et al. | |
| 2007/0168913 | A1 | 7/2007 | Sarukkai et al. | |
| 2007/0261027 | A1 | 11/2007 | Dhanakshirur et al. | |
| 2009/0164653 | A1 * | 6/2009 | Mandyam et al. | 709/231 |

OTHER PUBLICATIONS

John Desoi et al.; "A Graphical Environment for User-Interface Design and Development", Software Engineering Journal, vol. 5, Issue 5, Sep. 1990, pp. 289-299.

* cited by examiner

*Primary Examiner* — Cao "Kevin" Nguyen

(74) *Attorney, Agent, or Firm* — Karen Ng; Hoffman Warnick LLC

(57) ABSTRACT

Elements are used to define a user interface. Each element can include a corresponding user interface widget and/or arrangement information for the user interface. The elements and/or corresponding widgets are hierarchically related. Each element implements a set of application programming interfaces that enable the rendering of both design-time views (e.g., design view and preview view) of the user interface as well as a runtime view of the user interface. As a result, a designer is able to view exactly what will be generated during runtime, and a widget developer will not need to develop additional software to support the design environment.

20 Claims, 10 Drawing Sheets

USER INTERFACE RENDERING

TECHNICAL FIELD

The disclosure relates generally to rendering a user interface, and more particularly, to rendering different views of the user interface.

BACKGROUND ART

A graphical user interface design environment exposes libraries of user interface (UI) elements to programmers and graphical designers. The programmer/graphical designer can combine and physically arrange one or more of these UI elements into graphical user interface aggregates, such as forms, web pages, windows and dialogs. The presentation of these aggregates is controlled by a deployed and running software application. Current client/server application development and runtime environments allow a programmer to visually assemble a client-side graphical user interface aggregate, which is rendered at runtime from a text-based user interface definition.

Often, the design environment provides a core library that contains a base set of UI elements. UI element suppliers may define and provide their own sets of UI elements, which a programmer/graphical designer also can include in an aggregate. These UI elements can include newly invented UI elements and/or new UI elements that are created by combining multiple base UI elements. To date, UI element suppliers are typically required to provide both a runtime element to be used by an executing software application and a visualizer that represents the runtime element in the design environment. The visualizer enables the design environment to visually show and work with a design-time representation of the runtime element. Typically, the design environment requires the UI element supplier to write the visualizer using an application programming interface (API) of the particular design environment.

SUMMARY OF THE INVENTION

The inventor recognizes several disadvantages with the current state of the art. For example, the APIs for some design environments impose restrictions on the visualizer's physical appearance, which results in an inaccurate visual representation of the runtime UI element during design-time. Further, the UI element supplier needs to devote additional time and resources in creating the visualizer. As a result, the inventor recognizes a need for an ability for UI elements that are normally rendered in an application runtime environment to also be rendered in the design area of a design environment. In this case, among other benefits, the UI element supplier would no longer be required to create a separate visualizer for each UI element.

Aspects of the invention provide a solution in which elements are used to define a user interface. Each element can include a corresponding user interface widget and/or arrangement information for the user interface. The elements and/or corresponding widgets are hierarchically related. Each element implements a set of application programming interfaces that enable the rendering of both design-time views (e.g., design view and preview view) of the user interface as well as a runtime view of the user interface. As a result, a designer is able to view exactly what will be generated during runtime, and a widget developer will not need to develop additional software to support the design environment.

A first aspect of the invention provides a method of rendering a user interface, the method comprising: obtaining a plurality of user interface elements and hierarchical relationship information for the plurality of user interface elements that define the user interface, wherein the user interface includes a plurality of user interface widgets; identifying a top-level element in the plurality of user interface elements using the hierarchical relationship information, wherein the top-level element corresponds to a top-level user interface widget in the plurality of user interface widgets; requesting the top-level element to create the corresponding user interface widget, wherein the top-level element: determines whether the user interface is for a design environment or a runtime environment; and creates a proxy widget in response to a determination that the user interface is for the design environment or a runtime widget in response to a determination that the user interface is for the runtime environment; and rendering the corresponding user interface widget for the top-level element, wherein the proxy widget is rendered within another user interface widget, and wherein the runtime widget is not rendered within another user interface widget.

A second aspect of the invention provides a system for rendering a user interface, the system comprising: a plurality of user interface elements and hierarchical relationship information for the plurality of user interface elements that define the user interface, wherein the user interface includes a plurality of user interface widgets; and a component configured to render the user interface, wherein the component configured to render: identifies a top-level element in the plurality of user interface elements using the hierarchical relationship information, wherein the top-level element corresponds to a top-level user interface widget in the plurality of user interface widgets; requests the top-level element to create the corresponding user interface widget, wherein the top-level element: determines whether the user interface is for a design environment or a runtime environment; and creates a proxy widget in response to a determination that the user interface is for the design environment or a runtime widget in response to a determination that the user interface is for the runtime environment; and renders the corresponding user interface widget for the top-level element, wherein the proxy widget is rendered within another user interface widget, and wherein the runtime widget is not rendered within another user interface widget.

A third aspect of the invention provides a computer program comprising program code embodied in at least one computer-readable medium, which when executed, enables a computer system to implement a method of rendering a user interface, the method comprising: obtaining a plurality of user interface elements and hierarchical relationship information for the plurality of user interface elements that define the user interface, wherein the user interface includes a plurality of user interface widgets; identifying a top-level element in the plurality of user interface elements using the hierarchical relationship information, wherein the top-level element corresponds to a top-level user interface widget in the plurality of user interface widgets; requesting the top-level element to create the corresponding user interface widget, wherein the top-level element creates one of: a proxy widget for rendering within another user interface widget or a runtime widget for rendering at a top-level user interface widget; and rendering the corresponding user interface widget for the top-level element.

A fourth aspect of the invention provides a method of generating a system for rendering a user interface, the method comprising: providing a computer system operable to: obtain a plurality of user interface elements and hierarchical relationship information for the plurality of user interface elements that define the user interface, wherein the user interface includes a plurality of user interface widgets; identify a top-level element in the plurality of user interface elements using the hierarchical relationship information, wherein the top-level element corresponds to a top-level user interface widget in the plurality of user interface widgets; request the top-level element to create the corresponding user interface widget, wherein the top-level element creates one of: a proxy widget for rendering within another user interface widget or a runtime widget for rendering at a top-level user interface widget; and render the corresponding user interface widget for the top-level element.

A fifth aspect of the invention provides a method comprising: at least one of providing or receiving a copy of a computer program that is embodied in a set of data signals, wherein the computer program enables a computer system to implement a method of rendering a user interface, the method comprising: obtaining a plurality of user interface elements and hierarchical relationship information for the plurality of user interface elements that define the user interface, wherein the user interface includes a plurality of user interface widgets; identifying a top-level element in the plurality of user interface elements using the hierarchical relationship information, wherein the top-level element corresponds to a top-level user interface widget in the plurality of user interface widgets; requesting the top-level element to create the corresponding user interface widget, wherein the top-level element creates one of: a proxy widget for rendering within another user interface widget or a runtime widget for rendering at a top-level user interface widget; and rendering the corresponding user interface widget for the top-level element.

Other aspects of the invention provide methods, systems, program products, and methods of using and generating each, which include and/or implement some or all of the actions described herein. The illustrative aspects of the invention are designed to solve one or more of the problems herein described and/or one or more other problems not discussed.

BRIEF DESCRIPTION OF THE DRAWINGS

These and other features of the disclosure will be more readily understood from the following detailed description of the various aspects of the invention taken in conjunction with the accompanying drawings that depict various aspects of the invention.

It is noted that the drawings are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As indicated above, aspects of the invention provide a solution in which elements are used to define a user interface. Each element can include a corresponding user interface widget and/or arrangement information for the user interface. The elements and/or corresponding widgets are hierarchically related. Each element implements a set of application programming interfaces that enable the rendering of both design-time views (e.g., design view and preview view) of the user interface as well as a runtime view of the user interface. As a result, a designer is able to view exactly what will be generated during runtime, and a widget developer will not need to develop additional software to support the design environment. As used herein, unless otherwise noted, the term "set" means one or more (i.e., at least one) and the phrase "any solution" means any now known or later developed solution.

Figure 1:
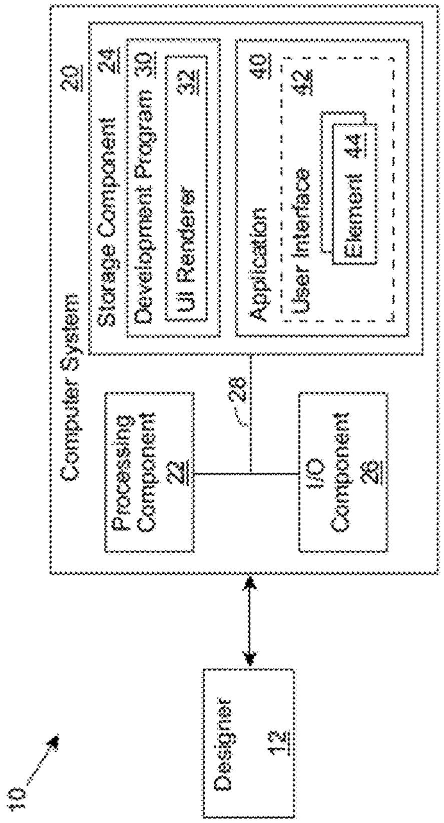
FIG. 1 shows an illustrative environment for developing an application that includes a user interface according to an embodiment.

Turning to the drawings, FIG. 1 shows an illustrative environment 10 for developing an application 40 that includes a user interface 42 according to an embodiment. To this extent, environment 10 includes a computer system 20 that can perform a process described herein in order to enable one or more users, such as designer 12, to develop application 40 and/or user interface 42. In particular, computer system 20 is shown including a development program 30, which makes computer system 20 operable to enable the user(s) to develop application 40, and in particular, to design user interface 42, by performing a process described herein.

Computer system 20 is shown including a processing component 22 (e.g., one or more processors), a storage component 24 (e.g., a storage hierarchy), an input/output (I/O) component 26 (e.g., one or more I/O interfaces and/or devices), and a communications pathway 28. In general, processing component 22 executes program code, such as development program 30, which is at least partially embodied in storage component 24. While executing program code, processing component 22 can process data, which can result in reading and/or writing the data to/from storage component 24 and/or I/O component 26 for further processing. Pathway 28 provides a communications link between each of the components in computer system 20. I/O component 26 can comprise one or more human I/O devices, which enable a human user, such as designer 12, to interact with computer system 20 and/or one or more communications devices to enable a system user, such as a computer system being used by designer 12, to communicate with computer system 20 using any type of communications link. To this extent, development program 30 can manage a set of interfaces (e.g., graphical user interface(s), application program interface, and/or the like) that enable human and/or system users to interact with development program 30. Further, development program 30 can manage (e.g., store, retrieve, create, manipulate, organize, present, etc.) the data, such as the various artifacts that define application 40, using any solution.

In any event, computer system 20 can comprise one or more general purpose computing articles of manufacture (e.g., computing devices) capable of executing program code installed thereon. As used herein, it is understood that "program code" means any collection of instructions, in any language, code or notation, that cause a computing device having an information processing capability to perform a particular function either directly or after any combination of the following: (a) conversion to another language, code or notation; (b) reproduction in a different material form; and/or (c) decompression. To this extent, development program 30 can be embodied as any combination of system software and/or application software.

Further, development program 30 can be implemented using a set of modules, such as user interface (UI) renderer 32. In this case, a module can enable computer system 20 to perform a set of tasks used by development program 30, and can be separately developed and/or implemented apart from other portions of development program 30. As used herein, the term "component" means any configuration of hardware, with or without software, which implements and/or enables a computer system 20 to implement the functionality described in conjunction therewith using any solution, while the term "module" means program code that enables a computer system 20 to implement the functionality described in conjunction therewith using any solution. When embodied in a tangible medium of expression, a module is a component. Regardless, it is understood that two or more components, modules, and/or systems may share some/all of their respective hardware and/or software. Further, it is understood that some of the functionality discussed herein may not be implemented or additional functionality may be included as part of computer system 20.

When computer system 20 comprises multiple computing devices, each computing device can have only a portion of development program 30 embodied thereon (e.g., one or more modules). However, it is understood that computer system 20 and development program 30 are only representative of various possible equivalent computer systems that may perform a process described herein. To this extent, in other embodiments, the functionality provided by computer system 20 and development program 30 can be at least partially implemented by one or more computing devices that include any combination of general and/or specific purpose hardware with or without program code. In each embodiment, the hardware and program code, if included, can be created using standard engineering and programming techniques, respectively.

Regardless, when computer system 20 includes multiple computing devices, the computing devices can communicate over any type of communications link. Further, while performing a process described herein, computer system 20 can communicate with one or more other computer systems using any type of communications link. In either case, the communications link can comprise any combination of various types of wired and/or wireless links; comprise any combination of one or more types of networks; and/or utilize any combination of various types of transmission techniques and protocols.

As discussed herein, development program 30 enables computer system 20 to enable one or more users, such as designer 12, to develop application 40. To this extent, as part of developing application 40, development program 30 can provide a design environment that assists designer 12 in designing a set of user interfaces 42. While executing, application 40 can generate one or more of the set of user interfaces 42, each of which enables an end user to provide data to and/or receive data from application 40 using any solution.

Each user interface 42 is defined by a set of elements 44. The elements 44 define a set of hierarchically related user interface widgets, each of which comprises a user interface object that has a physical presence and behavior. Further, the elements 44 define various display characteristics, e.g., the size, color, alignment, font, etc., which application 40 uses to render the widgets. To this extent, each element 44 can include a corresponding widget, data that defines display preferences for widget(s), and/or hierarchical relationship information for the element 44. Alternatively, hierarchical relationship information could be stored separately from the elements 44.

A user interface 42 will include a top-level element 44 that includes zero or more child elements 44, and which includes a corresponding user interface widget, e.g., a frame window, a dialog, a message box, and/or the like. The child elements can include zero or more corresponding widgets, such as a label, an entry field, a drop-down field, a combo box, a list box, menu items, a button, and/or the like, which enables an end user to interact with application 40 by viewing data, modifying data, providing data, and/or the like. Still further, the child elements can include zero or more child elements in order to group similar widgets, such as a wizard page, a tabbed panel, a tabbed panel page, a preference page, and/or the like. It is understood that computer system 20 can manage (e.g., store, define, create, edit, delete, display, etc.) the set of elements 44 and the relationship data that defines the hierarchical structure between the various elements 44 in the set of elements using any solution.

During the development of application 40, development program 30 can enable designer 12 to define user interface 42 by including various element(s) 44 using any solution. For example, UI renderer 32 can generate a design view of user interface 42 that enables designer 12 to view and graphically define the content and layout of user interface 42 (e.g., using drag and drop, or the like). Additionally, UI renderer 32 can generate a preview view of user interface 42 that enables designer 12 to view how user interface 42 will look when it is generated by application 40 during execution.

Figure 2:
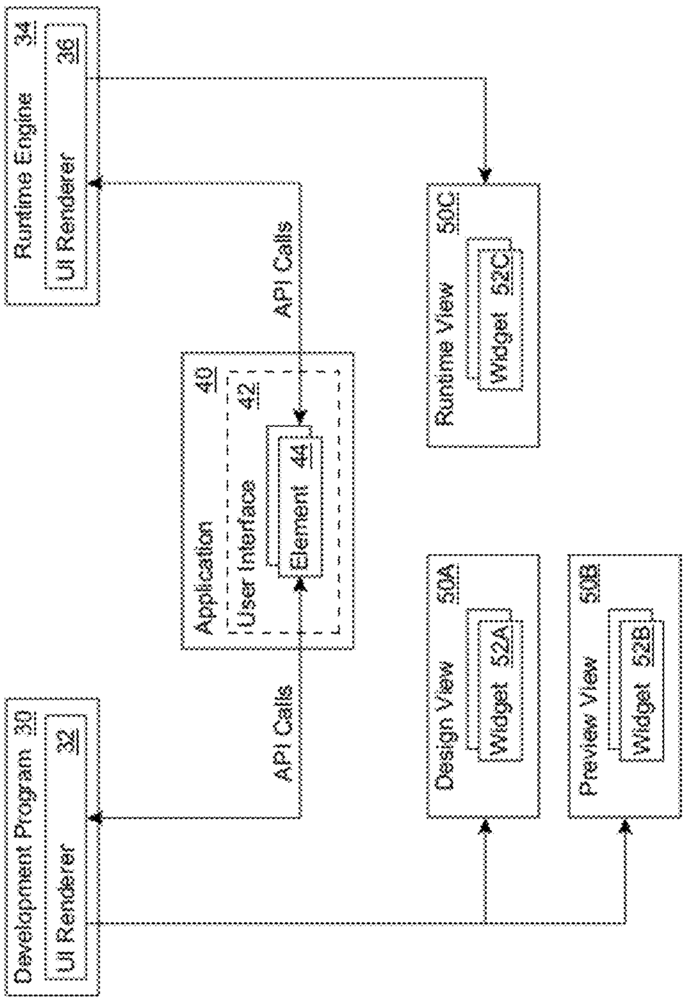
FIG. 2 shows an illustrative data flow diagram for generating various views of a user interface according to an embodiment of the invention.

An embodiment of the invention enables UI renderer 32 to use elements 44 and the corresponding widgets, which are configured to be generated by application 40 during execution, to generate both the design view and preview view of user interface 42. To this extent, FIG. 2 shows an illustrative data flow diagram for generating various views of user interface 42 according to an embodiment of the invention. As illustrated, UI renderer 32 for development program 30 makes a series of application program interface (API) calls to the set of elements 44 for user interface 42 to generate design view 50A and/or preview view 50B.

Figure 3:
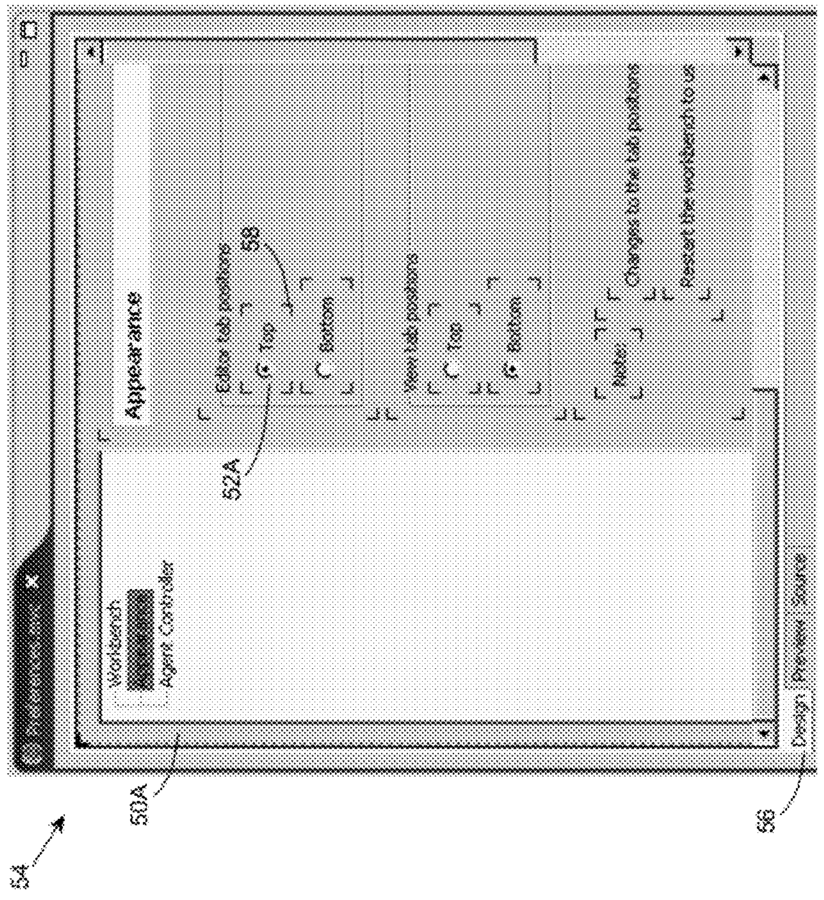
FIG. 3 shows an illustrative design view of an illustrative user interface according to an embodiment.

Design view 50A will include a representation of each widget 52A that is not active and enables designer 12 (FIG. 1) to move, resize, delete, etc. the widget 52A. To this extent, FIG. 3 shows an illustrative design view 50A of an illustrative user interface according to an embodiment, which can be generated by UI renderer 32 (FIG. 2). As illustrated, development program 30 (FIG. 2) can generate a window 54 that includes a group of tabs 56 that enable designer 12 (FIG. 1) to select various views of the user interface being developed. When generating design view 50A, UI renderer 32 can include indicators 58 that can assist designer 12 in positioning, resizing, etc., the corresponding widget 52A.

Figure 4:
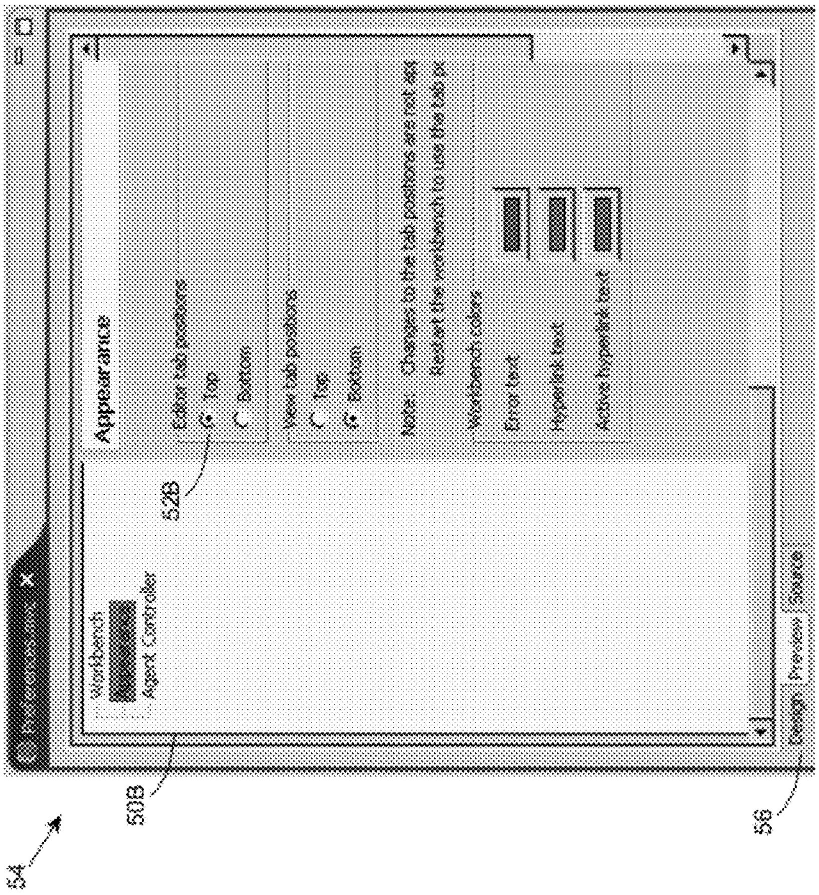
FIG. 4 shows an illustrative preview view of an illustrative user interface according to an embodiment.

FIG. 4 shows an illustrative preview view 50B of an illustrative user interface according to an embodiment, which can be generated by UI renderer 32 (FIG. 2). In general, it is desirable that preview view 50B appear the same as runtime view 50C (FIG. 2). Further, certain widgets, such as widget 52B, can implement some of their functionality (e.g., select radio button when clicked, only one radio button selected in a related group of radio buttons, text entry in entry field, etc.), which can enable designer 12 (FIG. 1) to determine whether further modifications are necessary for the widgets. As illustrated, preview view 50B can be included in the same window 54 that includes a group of tabs 56 as is used to render design view 50A (FIG. 3).

Figure 5:
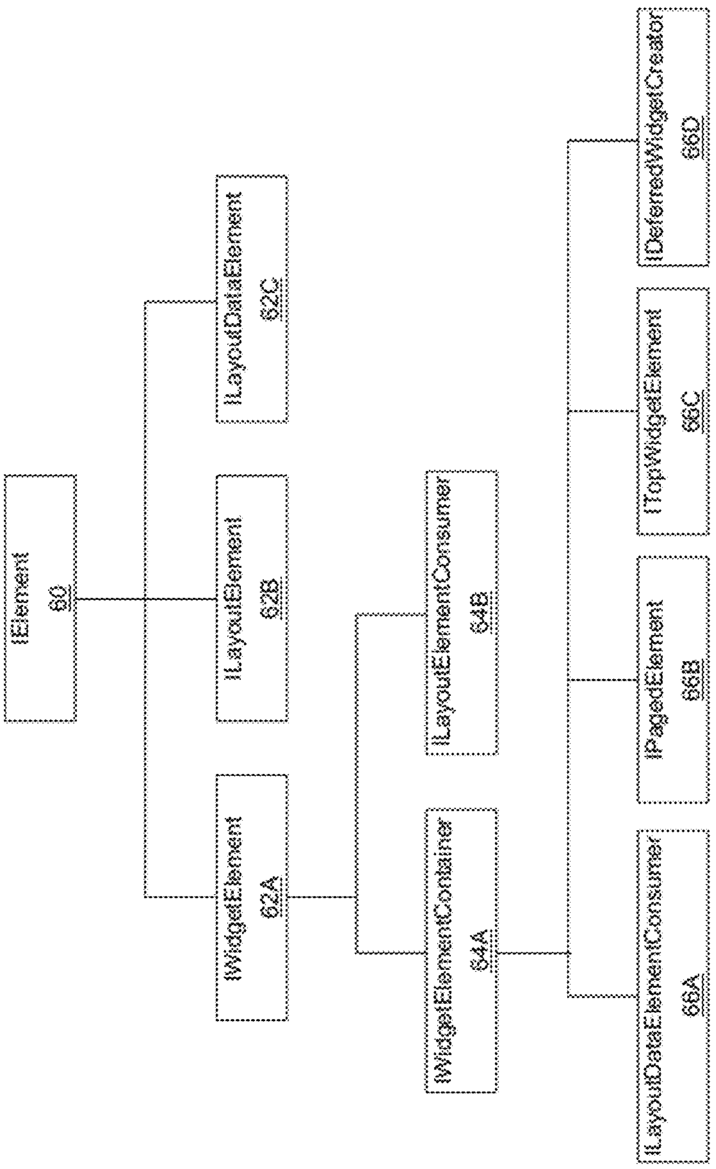
FIG. 5 shows an inheritance hierarchy for an illustrative set of application programming interfaces according to an embodiment.

Returning to FIG. 2, an embodiment of the invention enables UI renderers 32, 36 to use the same API calls to elements 44 of user interface 42 in order to generate the corresponding views 50A-C of the user interface 42. To this extent, each element 44 will implement an interface that includes sufficient functionality to enable both UI renderers 32, 36 to generate the corresponding views 50A-C. For example, FIG. 5 shows an inheritance hierarchy for an illustrative set of application programming interfaces according to an embodiment, which can be implemented by elements 44 of a user interface 42. Referring to FIGS. 2 and 5, each element 44 can implement one or more of the interfaces in the set of interfaces. Each interface has a corresponding set of methods that are implemented by an element 44. Interfaces that are shown on a lower level inherit the methods implemented by the parent interface located on the level above. To this extent, the ILayoutDataElementConsumer interface 66A inherits the methods implemented by the IWidgetElementContainer interface 64A, which inherits the methods implemented by the IWidgetElement interface 62A, which inherits the methods implemented by the IElement interface 60. Additionally, each child interface implements an additional set of methods beyond those implemented by the ancestors of the interface.

Each element 44 includes a set of common characteristics. For example, each element 44 can include an identifier. Additionally, all elements 44 except for the top-level element 44 will have a parent. To this extent, the set of interfaces can include an IElement interface 60 that implements a set of basic methods that are required for all types of elements 44. To this extent, the IElement interface 60 can implement the following methods:

| | |
|---|---|
| String getID( ) | Obtains the identifier of the element; |
| void setID(String ID) | Sets the identifier of the element; |
| void initialize( ) | Initializes the element; |
| IElement getParent( ) | Obtains the element's parent element; |
| void setParent(IElement parent) | Sets the parent element. |

An element 44 can include a corresponding user interface widget, which is displayed in the user interface 42. An element 44 that has a corresponding user interface widget is responsible for the creation, initialization, and destruction of the widget. The widget can be an operating system native widget, or a non-native widget such as a Swing component. To this extent, the set of interfaces is shown including an IWidgetElement interface 62A, which implements a set of basic methods that are required for all elements 44 that have a corresponding widget. For example, in addition to the methods defined for the IElement interface 60, the IWidgetElement interface 62A can implement the following methods:

| | |
|---|---|
| Object createWidget(Object) | Creates the element's widget given its parent widget; |
| void destroyWidget( ) | Destroys the element's widget; |
| Object getWidget( ) | Returns the element's widget. |

When widgets are created, they are assembled into a widget hierarchy. Using the createWidget method above, a parent widget is given to a child widget when the child widget is created. In this case, the parent widget must be created before the child widget. However, it is understood that this is only illustrative, and an alternative embodiment can allow the creation of a new widget and the later assignment of a parent widget to the new widget, which allows for the creation of child widgets before the parent widget. Each user interface 42 includes an element 44 that includes a top-level widget. The top-level widget element 44 can implement an ITopWidgetElement interface 66C, which can include a method, e.g., boolean open( ), that asks the top-level widget element 44 to display its widget (e.g., a window, dialog, wizard, etc.).

An element 44 also can contain an aggregate of widgets, where one of the widgets can contain a definable set of child widgets. For example, a wizard page may have a title area, a content area, and a page navigation area. In this case, the element 44 can implement an IWidgetElementContainer interface 64A, which includes a method, e.g., Object getContentParentWidget( ), that returns the element's 44 container widget. The container widget is capable of being a parent to application-specific child widgets. Using this method, a development program 30 can identify which of the aggregate of widgets is the content area widget where child widgets are to reside.

Additionally, an element 44 can comprise an associated widget for which it may be desirable to defer the creation of its corresponding set of child widgets. For example, a tabbed panel widget can include multiple tabs, each of which has an associated tabbed page with a corresponding set of user interface widgets. When presented to a user, the user may not select all of the tabs before closing the tabbed panel widget. In this case, each tabbed page may defer creating its content until the corresponding tab has been selected. In this case, element 44 can implement an IDeferredWidgetCreator interface 66D. The IDeferredWidgetCreator interface 66D can include the following methods:

| | |
|---|---|
| addUserInterfaceCreatorListener (IDeferredWidgetCreatorListener) | Adds the specified deferred widget creator listener to a list of listeners; |
| removeUserInterfaceCreatorListener (IDeferredWidgetCreatorListener) | Removes the specified deferred widget creator listener from the list of listeners. |

When the tabbed page is made visible, the tabbed page's widget can notify the element 44, which can notify an IDeferredWidgetCreatorListener interface by calling a corresponding createChildElements method that creates the child elements 44 of the IDeferredWidgetCreator element 44.

When a user interface element 44 includes multiple overlapping user interface areas (e.g., pages), only one of the user interface areas is displayed at any one time. In order to determine which page of the plurality of pages is to be displayed, each page can be assigned an index number. Additionally, the user interface element 44 can implement an IPagedElement interface 66B, which includes the following methods:

| | |
|---|---|
| int getCurrentPageIndex( ) | Returns the page index of the currently displayed page; |
| void setCurrentPageIndex( ) | Sets the current page index. If a widget is displayed, the current page index is used to determine which page is shown. |

The IPagedElement interface 66B enables a user interface renderer 32, 36 to select and/or determine which page is to be displayed.

An element 44 and a container element 44 that includes a set of elements can have preferred arrangement information.

For example, an element 44 can specify how it prefers to be positioned and sized within its parent container. To this extent, an entry field can include layout data information that specifies a preference of how it is positioned horizontally within its parent grid cell, e.g., to the left, to the right, centered, or the like. A container element 44 can include layout information that specifies how the container prefers its children to be arranged within itself. For example, a container that arranges its children in a two-dimensional grid can prefer to space its children m pixels apart horizontally and n pixels apart vertically. It is understood that a grid layout is only illustrative. To this extent, other layout types include a pixel or XY layout, in which each child is positioned using pixel coordinates, a stack or paged layout where only one child is shown at a time, or the like, which can be supported under one or more embodiments of the invention. Further, it is understood that the layout information can be specified by a user, e.g., designer 12 (FIG. 1), have a default setting, and/or the like.

In any event, a user interface element 44 that can be contained within another element 44 can comprise a child layout data element 44. The layout data element 44 includes a set of preferred characteristics that specify how the corresponding widget of the user interface element 44 is to be positioned and sized within its parent widget. To this extent, the layout data element 44 can implement an ILayoutDataElement interface 62C, which includes a method, e.g., void applyLayoutData (ILayoutDataElementConsumer), that applies the layout data to the user interface element's 44 widget. The parent user interface element 44 can implement an ILayoutDataElement-Consumer interface 66A, which includes the following methods:

| | |
|---|---|
| ILayoutDataElement getLayoutDataElement( ) | Returns the layout data element; |
| void setLayoutDataElement (ILayoutDataElement) | Gives the layout data element to the consumer. |

Additionally, a user interface element 44 that can contain child elements can have a corresponding child layout element 44. The child layout element 44 includes a set of preferred characteristics that specify how the corresponding widget of the parent element 44 is to position and size its child widgets. The child layout element 44 can implement an ILayoutElement interface 62B, which includes a method, e.g., void applyLayout(ILayoutElementConsumer), to position and size the child widgets within the user interface element's 44 widget. The child layout element can arrange the parent widget's child widgets using the preferred characteristics that are defined by the parent widget and the various child widgets using any solution. In general, a layout data element 44 of a contained element 44 and a layout element 44 of a container element 44 must have the same layout type (e.g., grid, pixel, etc.). The parent user interface element 44 can implement an ILayoutElementConsumer interface 64B, which includes the following methods:

| | |
|---|---|
| ILayoutElement getLayoutElement( ) | Returns the layout element that is responsible for arranging widgets; |
| setLayoutElement(ILayoutElement) | Gives the layout element to the consumer. |

Below is an illustrative user interface definition:

```
<wizarddialog>
  <wizardpage>
    <gridlayout columns="1" />
    <composite>
      <gridlayout columns="2" />
      <gridlayoutdata excessX="true" excessY="true" alignmentX="fill"
alignmentY="fill" indentX="0" />
      <label id="label1" text="Workspace save interval">
        <gridlayoutdata alignmentX="center" />
      </label>
      <entryfield id="entryfield1">
        <gridlayoutdata excessX="true" alignmentX="right" />
      </entryfield>
    </composite>
  </wizardpage>
  <wizardpage>
    ...
  </wizardpage>
</wizarddialog>
```

For the user interface definition above and illustrative set of application programming interfaces shown in FIG. 5, the following elements 44 and corresponding element interfaces implemented by each element 44 can be created:

| Element | Element Interfaces |
|---|---|
| wizarddialog | ITopWidgetElement, IPagedElement |
| wizardpage | ILayoutElementConsumer |
| gridlayout | ILayoutElement |
| composite | ILayoutElementConsumer, ILayoutDataElementConsumer |
| gridlayout | ILayoutElement |
| gridlayoutdata | ILayoutDataElement |
| label | ILayoutDataElementConsumer |
| gridlayoutdata | ILayoutDataElement |
| entryfield | ILayoutDataElementConsumer |
| gridlayoutdata | ILayoutDataElement |

Returning to FIG. 2, while application 40 is being executed by runtime engine 34, a top-level element 44 for the user interface 42 will generate a top-level widget 52C for the runtime view 50C of user interface 42. However, as previously discussed and shown in FIGS. 3 and 4, design view 50A and preview view 50B are frequently placed within a design area of another design window. In this case, the top-level element 44 for the user interface 42 should not generate a top-level widget that appears as an additional dialog, window, or the like, but should generate a widget that is integrated into the design area of the design window.

Figure 6:
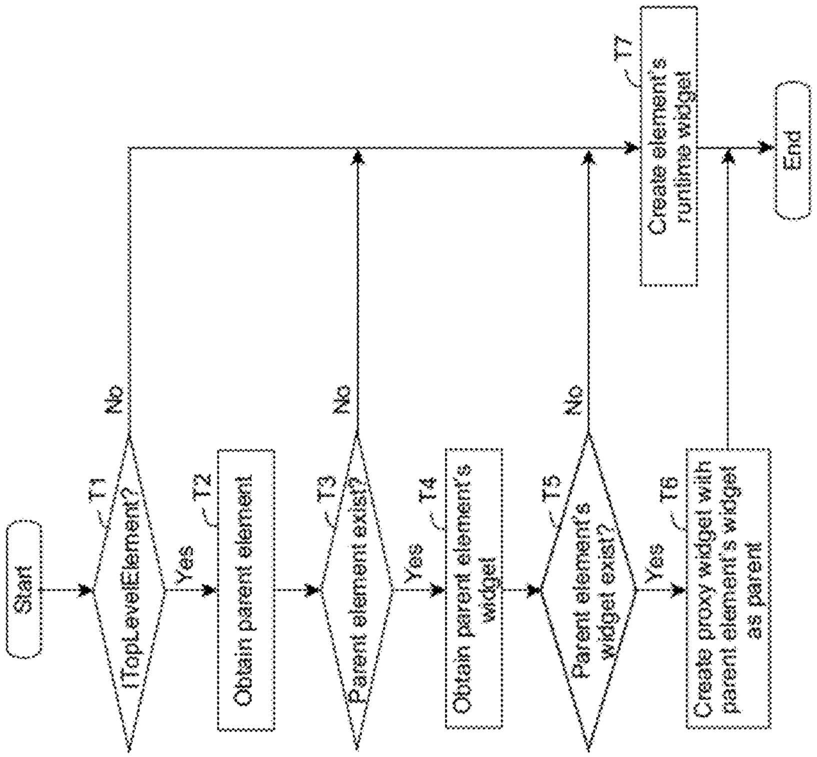
FIG. 6 shows an illustrative process for an element to generate its corresponding user interface widget according to an embodiment.

FIG. 6 shows an illustrative process for an element 44 to generate its corresponding user interface widget according to an embodiment. For example, the process of FIG. 6 can be implemented by the createWidget method provided by the IWidgetElement interface 62A (FIG. 5) as discussed above. Referring to FIGS. 2, 5, and 6, in process T1, element 44 determines whether it is an ITopLevelElement. If not, then in process T7, element 44 creates its corresponding runtime widget 50C. When element 44 is a top-level element (i.e., includes a corresponding top-level widget), in process T2, element 44 will attempt to obtain its parent element, e.g., using the getParent method of the IElement interface 60. In process T3, element 44 determines whether the parent element exists, e.g., by determining whether the getParent method returned a valid IElement, using any solution. If element 44 does not have a parent, then element 44 creates its runtime widget 50C in process T7.

Otherwise, in process T4, element 44 attempts to obtain a corresponding widget of the parent element, e.g., using the getWidget method implemented by the IWidgetElement interface 62A. In process T5, element 44 determines whether the parent element has a corresponding widget, e.g., by determining whether the getWidget method returned a valid Object, using any solution. Further, when using the Standard Widget Toolkit (SWT) user interface library, element 44 can examine the type of the widget that is returned. If the widget type is that of an SWT Composite, then a valid Object was returned.

If the parent element has a valid corresponding widget, then in process T6, element 44 creates a proxy widget with the parent element's widget as its parent. The proxy widget comprises a widget that is displayed within another widget and emulates the visual appearance and behavior of the runtime widget. In this manner, the top-level element 44 can create a widget that is rendered within window 54 (FIGS. 3, 4) that is created by development program 30. Otherwise, element 44 creates its runtime widget 50C in process T7. As a top-level widget, the runtime widget comprises a window, dialog, or the like, and is not rendered within another user interface widget.

Since each element 44, including the top-level element 44, can generate a corresponding widget regardless of whether it is being utilized by development program 30 in a development environment or runtime engine 34 in a runtime environment, UI renderers 32, 36 can implement the same process to generate views 50A-C. For example, FIGS. 7A-D show an illustrative process for generating a view of a user interface 42 according to an embodiment, which can be implemented by UI renderers 32, 36.

Figure 7A:
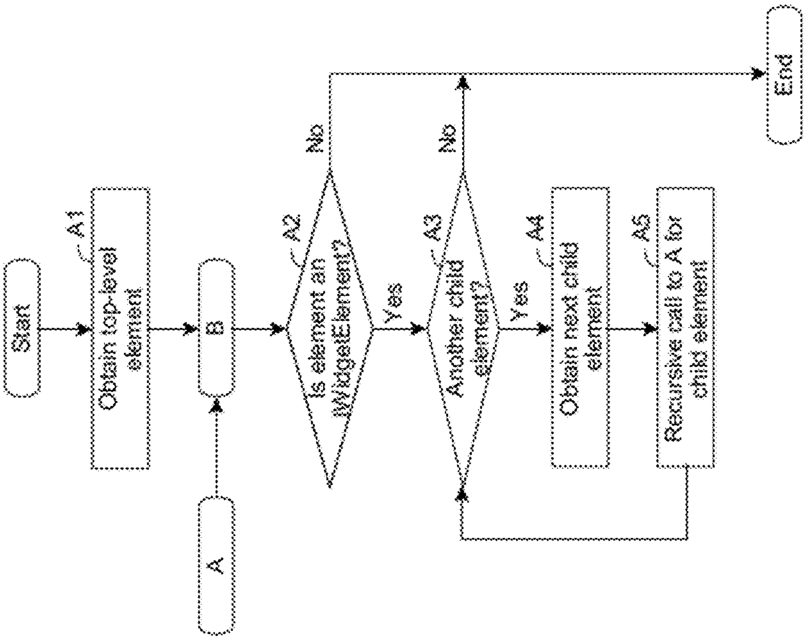
FIGS. 7A-D show an illustrative process for generating a view of a user interface according to an embodiment.
Figure 7B:
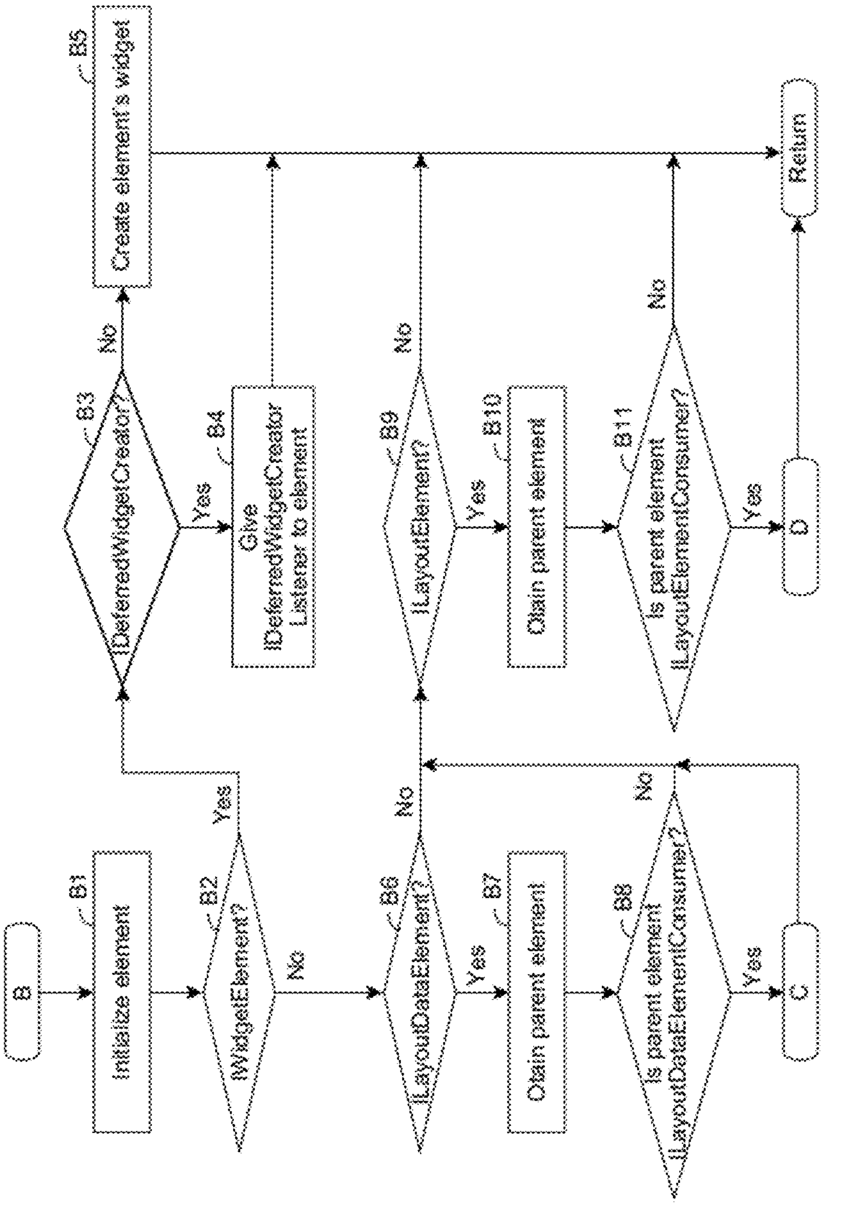

Referring to FIGS. 2 and 7A, in process A1, the UI renderer 32, 36 can identify the top-level element 44 for the user interface 42 using any solution, e.g., using hierarchical relationship information for the elements 44. Subsequently, the UI renderer will process the element based on its corresponding element type as discussed herein with respect to FIG. 7B. Subsequently, in process A2, the UI renderer determines whether the element is an IWidgetElement using any solution. If not, the processing for the element ends. Otherwise, the element may include one or more child elements. In process A3, the UI renderer determines whether there is another child element that requires processing. If so, then in process A4, the UI renderer obtains the next child element of the element using any solution, and in process A5, the UI renderer makes a recursive call to A in the process flow for the child element, in order to process the child element and create the descendent widget(s), if any. For the current element, processing returns to A3 to continue processing the child elements.

As discussed herein, the UI renderer 32, 36 will process each element 44 for the user interface 42 based on its corresponding element type in order to generate the corresponding view 50A-C. To this extent, referring to FIGS. 2 and 7B, after obtaining an unprocessed element 44, in process B1, the UI renderer will initialize the element using any solution, e.g., by calling the initialize method of the IElement interface 60 (FIG. 5). In process B2, the UI renderer determines whether the element includes a corresponding widget, e.g., by determining whether the element implements the IWidgetElement interface 62A (FIG. 5). If so, in process B3, the UI renderer determines whether the element supports deferred creation of its widget, e.g., by determining whether the element implements the IDeferredWidgetCreator interface 66D (FIG. 5). If so, in process B4, the UI renderer gives the IDeferredWidgetCreatorListener to the element, e.g., by calling the addDeferredWidgetCreatorListener method of the IDeferredWidgetCreator interface 66D. If the element does not support deferred creation of its widget, in process B5, the UI renderer requests that the element create its widget, e.g., by calling the createWidget method of the IWidgetElement interface 62A. In an embodiment, the element implements the process shown and described in FIG. 6 in order to create its widget.

When the UI renderer determines that the element does not include a corresponding widget in process B2, the UI renderer determines whether the element includes arrangement information, such as child layout data (e.g., a set of preferred characteristics specifying how a child widget is to be positioned and sized within its parent widget) and/or parent layout data (e.g., a set of preferred characteristics specifying how a parent widget is to position and size its child widgets), and processes the element accordingly. To this extent, in process B6, the UI renderer determines whether the element includes child layout data, e.g., by determining whether the element implements the ILayoutDataElement interface 62C. If so, in process B7, the UI renderer obtains the parent element of the current element, e.g., using the getParent method of the IElement interface 60. In process B8, the UI renderer determines whether the parent element processes the child layout data, e.g., by determining whether the parent element implements the ILayoutDataElementConsumer interface 66A. If so, the UI renderer will continue processing the element as described with reference to FIG. 7C.

In any event, in process B9, the UI renderer determines whether the element includes parent layout data, e.g., by determining whether the element implements the ILayoutElement interface 62B. If so, in process B10, the UI renderer obtains the parent element of the current element, e.g., using the getParent method of the IElement interface 60. In process B11, the UI renderer determines whether the parent element processes the parent layout data, e.g, by determining whether the parent element implements the ILayoutElementConsumer interface 64B. If so, the UI renderer will continue processing the element as described with reference to FIG. 7D.

Figure 7C:
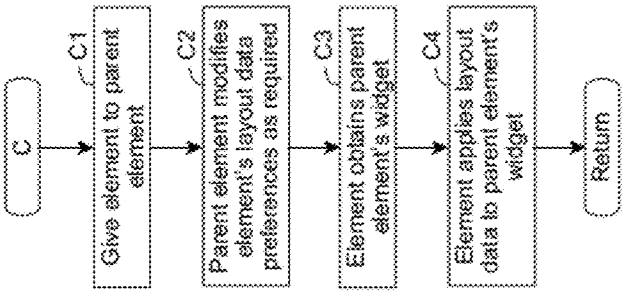

Turning to FIG. 7C, when the current element includes child layout data and the parent element of the current element processes the child layout data, in process C1, the UI renderer gives the current element to the parent element, e.g., by calling the setLayoutDataElement method of the ILayoutDataElementConsumer interface 66A. In process C2, the parent element modifies the current element's layout data preferences as required. In process C3, the current element obtains the parent element's widget, e.g., by calling the getWidget method of the IWidgetElement interface 62A. In process C4, the current element applies the child layout data to the parent element's widget.

Figure 7D:
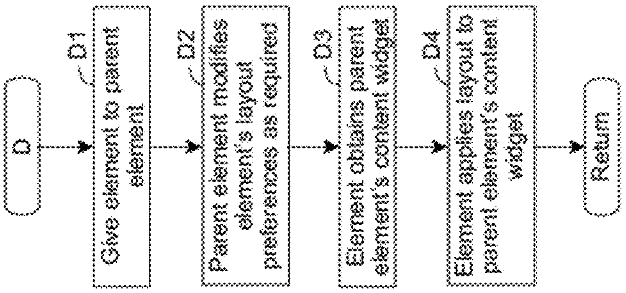

Turning to FIG. 7D, when the current element includes parent layout data and the parent element of the current element processes the parent layout data, in process D1, the UI renderer gives the current element to the parent element, e.g., by calling the setLayoutElement method of the ILayoutElementConsumer interface 64B. In process D2, the parent element modifies the current element's layout preferences as required. In process D3, the current element obtains the parent element's content widget, e.g., by calling the getContentParentWidget method of the IWidgetElementElementContainer interface 64A. In process D4, the current element applies the parent layout data to the parent element's content widget.

Returning to FIG. 2, after processing all of the elements 44 for a user interface 42, the UI renderer 32, 36 can render the corresponding view 50A-C for the user interface 42. To this extent, the UI renderer 32, 36 can ensure that any element 44 that is visible and supports deferred widget creation creates its widgets for display in the view 50A-C. Further, if necessary, the UI renderer can add any indicia, such as indicators 58 (FIG. 3) in a design view 50A.

As discussed herein, UI renderer 32 can create two different views for user interface 42, e.g., a design view 50A and a preview view 50B. When a designer 12 (FIG. 1) is developing a user interface 42 that includes overlapping paged widgets, only one of which is displayed at a time, it may be desirable to synchronize the particular paged widget that is displayed in both the design view 50A and the preview view 50B. For example, if a designer 12 is designing a preference dialog user interface 42 with four preference pages, and the second page is being designed using the design view 50A, when the designer 12 turns to the preview view 50B, the second page of the preview view's 50B preference dialog should be displayed. For views 50A-B, UI renderer 32 can maintain separate, identical user interface hierarchy trees. UI renderer 32 can maintain synchronization between the two user interface hierarchy trees by traversing one user interface hierarchy tree (e.g., corresponding to the design view 50A), and updating the paged widget to be displayed for the other user interface hierarchy tree (e.g., corresponding to the preview view 50B) with the paged widget currently displayed in the one user interface hierarchy tree.

Figure 8:
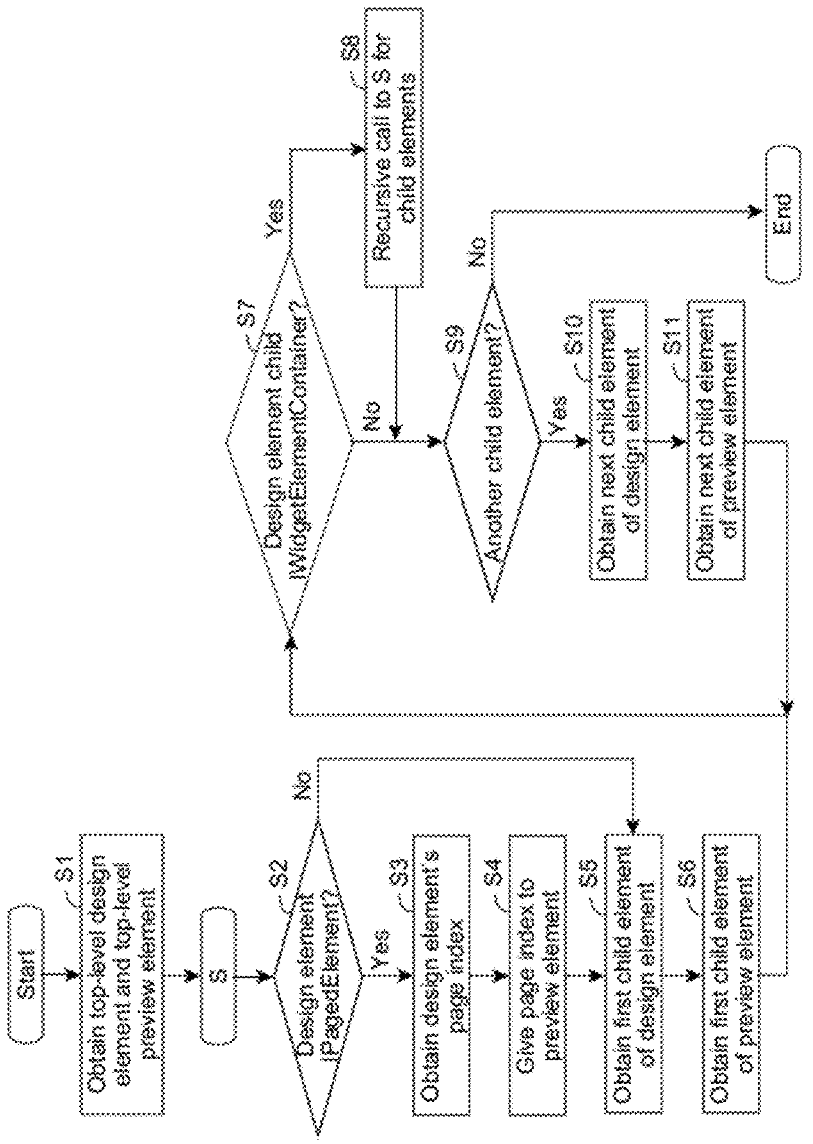
FIG. 8 shows an illustrative process for synchronizing the overlapping pages of a user interface according to an embodiment.

To this extent, FIG. 8 shows an illustrative process for synchronizing the overlapping pages of a user interface 42 according to an embodiment, which can be implemented by UI renderer 32. In process S1, the UI renderer can obtain the top-level element in the design view hierarchy tree and the top-level element in the preview view hierarchy tree using any solution, e.g., using hierarchical relationship information for the elements. In process S2, the UI renderer determines whether the current design element may include multiple pages, e.g., by determining whether the design element implements an IPagedElement interface 66B (FIG. 5). If so, in process S3, the UI renderer obtains the design element's page index, e.g., using getCurrentPageIndex method of the IPagedElement interface 66B, and in process S4, gives the page index to the preview element, e.g., using the setCurrentPageIndex method of the IPagedElement interface 66B.

In any event, in process S5, the UI renderer obtains the first child element of the design element, and in process S6, the UI renderer obtains the first child element of the preview element. In process S7, the UI renderer determines whether the design child element may include multiple pages or include a child widget that includes multiple pages, e.g., the UI renderer can determine whether the UI renderer implements the IWidgetElementContainer interface 64A (FIG. 5). If so, in process S8, the UI renderer makes a recursive call to S for the child design and preview elements. In process S9, the UI renderer determines whether the current child element includes another child element, and if so, in process S10, the UI renderer obtains the next child element of the design element and in process S11, the UI renderer obtains the next child element of the preview element. The process then returns to process S7 to evaluate the current child elements.

It is understood that the methods shown and described herein are only illustrative. To this extent, one or more of the processes described herein can be performed in parallel, combined, or omitted. Further, while the illustrative process of FIG. 8 synchronizes the preview view 50B to the current state of the design view 50A, it is understood that the UI renderer could synchronize the design view 50A to the current state of the preview view 50B in a similar manner.

Returning to FIG. 2, as discussed herein, an embodiment provides elements 44 that are configured to represent runtime widgets for user interface 42. Each element 44 is used by UI renderer 36 at runtime to construct a hierarchical user interface tree. Additionally, the element 44 is also used at design-time by UI renderer 32, which allows a designer 12 (FIG. 1) to construct and create a hierarchical user interface tree. The element 44 implements a set of application programming interfaces that allows both the runtime and design-time environments to understand the element's 44 widget's capabilities. This allows a third party to create a new runtime widget and corresponding element 44, without having to create a parallel representative entity for the design-time environment. Since the design-time element and the run-time element are the same element 44, no element transformation occurs when going from the development to the runtime environment. In an embodiment, elements 44 are written in Java, and can represent an SWT, or Eclipse UI widgets. Both the design-time and run-time environments can be Eclipse based, where the run-time environment is the Eclipse Rich Client Platform. In an embodiment, the development program 30 stores a designed user interface tree for user interface 42 as an XML file. In this case, the runtime engine 34 reads and renders the XML into Eclipse and SWT widgets.

While shown and described herein as a method and system for generating various views of a user interface, it is understood that aspects of the invention further provide various alternative embodiments. For example, in one embodiment, the invention provides a computer program embodied in at least one computer-readable medium, which when executed, enables a computer system to generate one or more views of a user interface. To this extent, the computer-readable medium includes program code, such as development program 30 (FIG. 1), which implements some or all of a process described herein. It is understood that the term "computer-readable medium" comprises one or more of any type of tangible medium of expression capable of embodying a copy of the program code (e.g., a physical embodiment). For example, the computer-readable medium can comprise: one or more portable storage articles of manufacture; one or more memory/storage components of a computing device; paper; and/or the like. Further, a copy of the program code can be transitory, e.g., embodied in a modulated data signal having one or more of its characteristics set and/or changed in such a manner as to encode information in the signal.

In another embodiment, the invention provides a method of providing a copy of program code, such as development program 30 (FIG. 1), which implements some or all of a process described herein. In this case, a computer system can generate and transmit, for reception at a second, distinct location, a set of data signals that has one or more of its characteristics set and/or changed in such a manner as to encode a copy of the program code in the set of data signals. Similarly, an embodiment of the invention provides a method of acquiring a copy of program code that implements some or all of a process described herein, which includes a computer system receiving the set of data signals described herein, and translating the set of data signals into a copy of the computer program embodied in at least one computer-readable medium. In either case, the set of data signals can be transmitted/received using any type of communications link.

In still another embodiment, the invention provides a method of generating a system for generating various views of a user interface. In this case, a computer system, such as computer system 20 (FIG. 1), can be obtained (e.g., created, maintained, made available, etc.) and one or more modules for performing a process described herein can be obtained (e.g., created, purchased, used, modified, etc.) and deployed to the computer system. To this extent, the deployment can comprise one or more of: (1) installing program code on a computing device from a computer-readable medium; (2) adding one or more computing and/or I/O devices to the computer system; and (3) incorporating and/or modifying the computer system to enable it to perform a process described herein.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A method of rendering a user interface, the method comprising:

obtaining a plurality of user interface elements and hierarchical relationship information for the plurality of user interface elements that define the user interface, wherein the user interface includes a plurality of user interface widgets;

identifying a top-level element in the plurality of user interface elements using the hierarchical relationship information, wherein the top-level element corresponds to a top-level user interface widget in the plurality of user interface widgets;

requesting the top-level element to create the corresponding user interface widget, wherein the top-level element:

determines whether the user interface is for a design environment or a runtime environment; and creates a proxy widget in response to a determination that the user interface is for the design environment or a runtime widget in response to a determination that the user interface is for the runtime environment; and rendering the corresponding user interface widget for the top-level element, wherein the proxy widget is rendered within another user interface widget, and wherein the runtime widget is not rendered within another user interface widget.

2. The method of claim 1, further comprising processing the remainder of the plurality of user interface elements that define the user interface using the hierarchical relationship information to render the user interface.

3. The method of claim 2, wherein the processing includes:

determining whether a user interface element includes a corresponding user interface widget;

requesting the user interface element to create the corresponding user interface widget and rendering the corresponding user interface widget in response to the user interface element including the corresponding user interface widget; and requesting a parent element of the user interface element to process arrangement information for the user interface element in response to the user interface element including arrangement information.

4. The method of claim 2, wherein the processing includes obtaining a user interface element having a corresponding user interface widget, wherein the user interface element includes a parent element having a corresponding parent user interface widget and at least one child element having a corresponding child user interface widget.

5. The method of claim 4, wherein the user interface element includes a plurality of child user interface elements, each child user interface element having a corresponding child user interface widget that comprises one of a plurality of overlapping pages, wherein the processing includes adding a listener for each child user interface element to the user interface element, wherein the listener enables deferred creation of the corresponding page until the page is to be rendered.

6. The method of claim 5, wherein the rendering is for one of: a design view or a preview view for the user interface in a design environment, the method further comprising:

identifying the one of the plurality of overlapping pages being rendered for the design view or the preview view; and synchronizing a corresponding one of the plurality of overlapping pages to be rendered for the other of the design view or the preview view with the one of the overlapping plurality of pages being rendered.

7. The method of claim 1, wherein the top-level element determines that the user interface is for the design environment in response to the top-level element having a parent that has a user interface widget.

8. The method of claim 1, wherein the rendering is for a design view of the user interface, and wherein the rendering includes adding a set of design indicia to the user interface widget.

9. A system for rendering a user interface, the system comprising:

a plurality of user interface elements and hierarchical relationship information for the plurality of user interface elements that define the user interface, wherein the user interface includes a plurality of user interface widgets; and a component configured to render the user interface, wherein the component configured to render:

identifies a top-level element in the plurality of user interface elements using the hierarchical relationship information, wherein the top-level element corresponds to a top-level user interface widget in the plurality of user interface widgets;

requests the top-level element to create the corresponding user interface widget, wherein the top-level element:

determines whether the user interface is for a design environment or a runtime environment; and creates a proxy widget in response to a determination that the user interface is for the design environment or a runtime widget in response to a determination that the user interface is for the runtime environment; and renders the corresponding user interface widget for the top-level element, wherein the proxy widget is rendered within another user interface widget, and wherein the runtime widget is not rendered within another user interface widget.

10. The system of claim 9, wherein the component configured to render further processes the remainder of the plurality of user interface elements that define the user interface using the hierarchical relationship information to render the user interface.

11. The system of claim 10, wherein the processing the remainder of the plurality of user interface elements includes:

determining whether a user interface element includes a corresponding user interface widget;

requesting the user interface element to create the corresponding user interface widget and rendering the corresponding user interface widget in response to the user interface element including the corresponding user interface widget; and requesting a parent element of the user interface element to process arrangement information for the user interface element in response to the user interface element including arrangement information.

12. The system of claim 10, wherein the processing the remainder of the plurality of user interface elements includes obtaining a user interface element having a corresponding user interface widget, wherein the user interface element includes a parent element having a corresponding parent user interface widget and at least one child element having a corresponding child user interface widget.

13. The system of claim 12, wherein the user interface element includes a plurality of child user interface elements, each child user interface element having a corresponding child user interface widget that comprises one of a plurality of overlapping pages, wherein the processing the remainder of the plurality of user interface elements includes adding a listener for each child user interface element to the user interface element, wherein the listener enables deferred creation of the corresponding page until the page is to be rendered.

14. The system of claim 13, wherein the user interface is for a design environment and the component configured to render renders at least one of: a design view or a preview view for the user interface, wherein the component configured to render further:

identifies the one of the plurality of pages being rendered for the design view or the preview view; and synchronizes a corresponding one of the plurality of overlapping pages to be rendered for the other of the design view or the preview view with the one of the plurality of pages being rendered.

15. The system of claim 9, wherein the top-level element determines that the user interface is for the design environment in response to the top-level element having a parent that has a user interface widget.

16. The system of claim 9, wherein the component configured to render renders a design view of the user interface, and wherein the component configured to render adds a set of design indicia to the user interface widget.

17. A computer program comprising program code embodied in at least one computer-readable medium, which when executed, enables a computer system to implement a method of rendering a user interface, the method comprising:

obtaining a plurality of user interface elements and hierarchical relationship information for the plurality of user interface elements that define the user interface, wherein the user interface includes a plurality of user interface widgets;

identifying a top-level element in the plurality of user interface elements using the hierarchical relationship information, wherein the top-level element corresponds to a top-level user interface widget in the plurality of user interface widgets;

requesting the top-level element to create the corresponding user interface widget, wherein the top-level element determines what type of user interface environment is to be rendered and creates, responsive to the top-level element determining that a design environment is to be rendered, a proxy widget for rendering within another user interface widget or, responsive to the top-level element determining that a runtime environment is to be rendered, a runtime widget for rendering at a top-level user interface widget; and rendering the corresponding user interface widget for the top-level element.

18. The computer program of claim 17, the method further comprising processing the remainder of the plurality of user interface elements that define the user interface using the hierarchical relationship information to render the user interface.

19. The computer program of claim 17, wherein the rendering is for one of: a design view or a preview view for the user interface in a design environment, the method further comprising synchronizing a corresponding one of a plurality of overlapping pages to be rendered for the other of the design view or the preview view with the one of the plurality of pages being rendered.

20. The computer program of claim 17, wherein, responsive to the determination of the user interface environment to be rendered, the rendering is for a respective one of: a design view, a preview view, or a runtime view of the user interface.

* * * * *